(12) United States Patent
Bick et al.

(10) Patent No.: US 11,028,770 B2
(45) Date of Patent: Jun. 8, 2021

(54) CONNECTING ROD OF AN INTERNAL COMBUSTION ENGINE FOR CHANGING THE COMPRESSION RATIO

(71) Applicant: FEV Europe GmbH, Aachen (DE)

(72) Inventors: Werner Bick, Würselen (DE); Martin Koch, Aachen (DE); Thomas Saupe, Aachen (DE); Erwin Reichert, Alsdorf (DE); Ralf Bey, Aachen (DE); Christopher Marten, Aachen (DE); Martin Pieper, Aachen (DE)

(73) Assignee: FEV Europe GmbH, Aachen (DE)

( * ) Notice: Subject to any disclaimer, the term of this patent is extended or adjusted under 35 U.S.C. 154(b) by 57 days.

(21) Appl. No.: 16/454,314

(22) Filed: Jun. 27, 2019

(65) Prior Publication Data

US 2020/0003114 A1     Jan. 2, 2020

(30) Foreign Application Priority Data

| Jun. 27, 2018 | (DE) | 102018115484.4 |
| Aug. 14, 2018 | (DE) | 102018119709.8 |
| Feb. 18, 2019 | (DE) | 102019103998.3 |
| Jun. 12, 2019 | (DE) | 102019115994.6 |

(51) Int. Cl.
  *F02B 75/04* (2006.01)
  *F16C 7/06* (2006.01)
  *F16C 23/10* (2006.01)

(52) U.S. Cl.
  CPC .............. *F02B 75/04* (2013.01); *F16C 7/06* (2013.01); *F16C 23/10* (2013.01); *F16C 2360/22* (2013.01)

(58) Field of Classification Search
  CPC .......... F02B 75/04; F02B 75/045; F16C 7/06; F16C 23/10; F16C 2360/22; F16C 3/28
  See application file for complete search history.

(56) References Cited

U.S. PATENT DOCUMENTS

| 1,391,795 | A | 9/1921 | Safford |
| 2,080,935 | A | 5/1937 | Slyk |
| 2,856,250 | A | 10/1958 | Thoma |
| 2,989,954 | A | 6/1961 | Hulbert |
| 4,251,083 | A | 2/1981 | Montes |
| 5,960,750 | A | 10/1999 | Kreuter |
| 6,428,014 | B2 | 8/2002 | Scarlett |
| 6,497,203 | B1 * | 12/2002 | Rao ................ F02B 75/045 123/48 B |
| 7,341,256 | B2 | 3/2008 | Nakaoka et al. |
| 8,177,237 | B2 | 5/2012 | Lindner-Silwester et al. |
| 9,528,546 | B2 | 12/2016 | Melde-Tuczai |
| 9,677,469 | B2 | 6/2017 | Wittek |
| 10,060,531 | B2 | 8/2018 | Mayer |

(Continued)

FOREIGN PATENT DOCUMENTS

| DE | 3148193 A1 | 6/1983 |
| DE | 19703948 C1 | 6/1998 |

(Continued)

*Primary Examiner* — Jacob M Amick
*Assistant Examiner* — Charles J Brauch
(74) *Attorney, Agent, or Firm* — Dinsmore & Shohl LLP

(57) ABSTRACT

The connecting rod head includes at least one oil chamber and an eccentric comprises a protrusion reaching into the oil chamber, so that an oil pressure in the oil chamber exerts a force on the protrusion to change the eccentric setting of the eccentric.

20 Claims, 7 Drawing Sheets

(56) References Cited

U.S. PATENT DOCUMENTS

| | | |
|---|---|---|
| 2002/0017264 A1 | 2/2002 | Pong |
| 2002/0117129 A1 | 8/2002 | Aoyama et al. |
| 2004/0025814 A1 | 2/2004 | Gray, Jr. |
| 2004/0231619 A1 | 11/2004 | Hirano |
| 2004/0261733 A1 | 12/2004 | Henig et al. |
| 2007/0034186 A1 | 2/2007 | Hefley |
| 2007/0175422 A1 | 8/2007 | Takahashi et al. |
| 2010/0218746 A1 | 9/2010 | Rabhi |
| 2011/0120421 A1 | 5/2011 | Engineer |
| 2012/0085309 A1 | 4/2012 | Cleeves et al. |
| 2014/0366834 A1 | 12/2014 | Melde-Tuczai |
| 2015/0075497 A1 | 3/2015 | Hutzelmann et al. |
| 2015/0152794 A1 | 6/2015 | Paul |
| 2015/0233288 A1 | 8/2015 | Paul |
| 2015/0260109 A1 | 9/2015 | Wittek |
| 2015/0300272 A1 | 10/2015 | Pluta |
| 2016/0319737 A1 | 11/2016 | Schaffrath et al. |
| 2017/0284455 A1* | 10/2017 | Kim .................... F16J 1/16 |
| 2017/0342896 A1* | 11/2017 | Ezaki .................. F16C 7/06 |

FOREIGN PATENT DOCUMENTS

| | | | |
|---|---|---|---|
| DE | 102005055199 A1 | 5/2007 | |
| DE | 102006042072 A1 | 3/2008 | |
| DE | 102007040699 A1 | 3/2009 | |
| DE | 102010016037 A1 | 9/2011 | |
| DE | 102011108790 A1 | 1/2013 | |
| DE | 102012014917 A1 | 2/2013 | |
| DE | 102011056298 A1 | 6/2013 | |
| DE | 102012020999 A1 | 1/2014 | |
| DE | 102012107868 A1 | 2/2014 | |
| DE | 102013021065 A1 | 6/2015 | |
| DE | 102015203378 A1 * | 8/2016 | ............ F02D 15/02 |
| EP | 1424486 A1 | 6/2004 | |
| GB | 473887 A | 10/1937 | |
| JP | 58091340 A * | 5/1983 | ............ F02D 15/02 |
| WO | 2013006892 A1 | 1/2013 | |
| WO | 2013092364 A1 | 6/2013 | |
| WO | 2014019683 A1 | 2/2014 | |
| WO | 2014019684 A1 | 2/2014 | |
| WO | 2015155167 A2 | 10/2015 | |

* cited by examiner

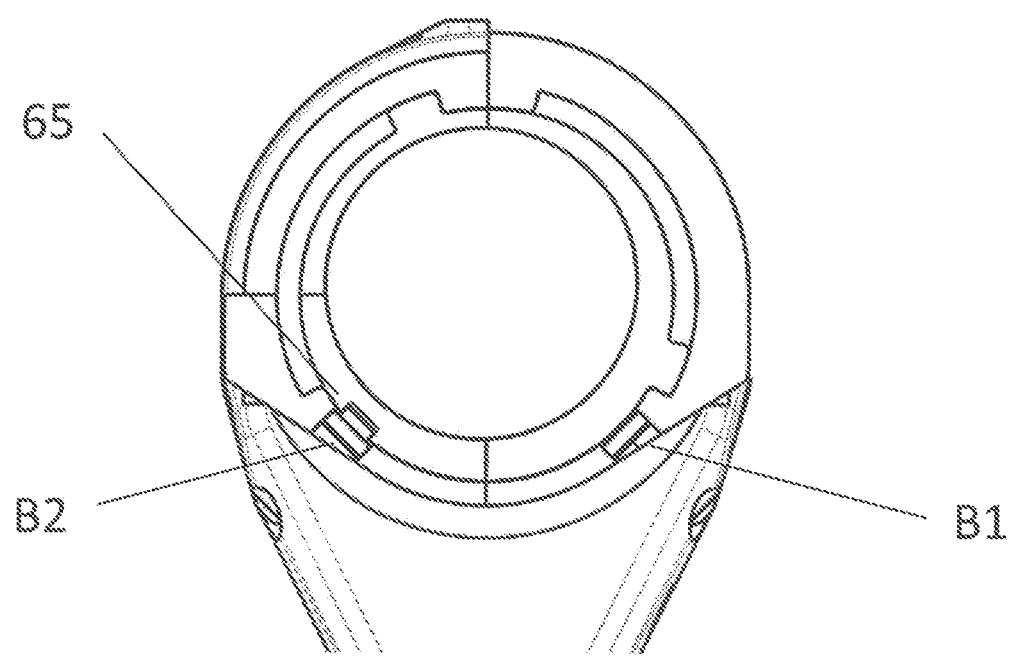

CONNECTING ROD OF AN INTERNAL COMBUSTION ENGINE FOR CHANGING THE COMPRESSION RATIO

CROSS-REFERENCE TO RELATED APPLICATIONS

This application claims priority from Application 102019115994.6 filed on Jun. 12, 2019 in Germany; 102019103998.3 filed on Feb. 18, 2019 in Germany; 102018119709.8 filed on Aug. 14, 2018 in Germany; and 102018115484.4 filed on Jun. 27, 2018 in Germany.

FIELD OF THE INVENTION

The present disclosure relates to a connecting rod for an internal combustion engine with a variable compression ratio.

BACKGROUND OF THE INVENTION

Internal combustion engines with a variable compression ratio are known for example from WO 2014/019683 A1. In the device disclosed there, an eccentric is used to adjust an optimized compression ratio depending on the given combustion conditions. In this device, two hydraulic cylinders are used, also known as support cylinders, with which the eccentric (ring) can be turned relative to the head of the connecting rod, by which the compression ratio is changed.

In engines with a large stroke/bore ratio (s/D≥1.3), the support cylinders require a relatively large design space, with the result that the space in the engine cylinder for the corresponding connecting rod becomes quite tight. The space also becomes tight in the case of a large displacement for the connecting rod, since it performs not only a reciprocating movement, but also a swiveling movement.

The problem which the present disclosure proposes to solve is to provide an alternative device for adjusting the compression ratio. In particular, a space-saving design is desired, so that high stroke/bore ratios, as well as piston pin to bore ratios can be realized. Moreover, the overall weight of the device for switching the compression ratio should be as low as possible.

SUMMARY

A connecting rod for an internal combustion engine includes a device for changing a compression ratio (VCR), having a connecting rod head and a connecting rod pin, which is mounted by an eccentric relative to the connecting rod head. The connecting rod head or the connecting rod pin includes at least one oil chamber and the eccentric includes a protrusion reaching into the oil chamber, so that an oil pressure in the oil chamber exerts a force on the protrusion to change the eccentric setting of the eccentric. The oil chamber is bounded by a radial surface of the eccentric, among others. The protrusion in particular is radial, or it has a radial component of its orientation. The eccentric in particular is ring-shaped with round non-coaxial outer and inner lateral surfaces. The protrusion in particular is a single piece with the eccentric or rigidly joined to it. The connecting rod pin may also be viewed as being a section of the crankshaft. The oil chamber may be viewed as being a curved hydraulic cylinder, which is situated around the eccentric and in which the protrusion is received. Thus, traditional hydraulic cylinders are no longer needed. Furthermore, with such an oil chamber a swiveling movement of the eccentric in both directions can be achieved. This saves on design space. If, furthermore, multiple oil chambers are used, they can be correspondingly smaller in design to achieve the same setting torque. Moreover, multiple oil chambers have the benefit of less risk of canting when the swivel forces are generated. The protrusions may alternatively be directed radially inward, so that the oil chamber(s) in this case is/are arranged on the connecting rod pin. It is furthermore seen as being equivalent for the eccentric to comprise an oil chamber and for the protrusion to be on the other respective functional part. In other words: the oil chamber may have a defined movement range for the protrusion, at the ends of which is situated respectively at least one oil inlet and one oil outlet. In this way, a dual-action device is provided, which is space-saving. The movement range can be limited by end stops at both ends.

Moreover, it is advantageous for a lubricant supply chamber to be provided between the connecting rod head and the eccentric and for the eccentric to have a breach associated with the lubricant supply chamber. Thus, regardless of the set eccentric angle a fluidic connection is always created between a supply duct of the connecting rod and a supply duct of the connecting rod pin. It is possible to provide a lubricant supply chamber whose circumferential extension substantially corresponds to the setting angle range for changing the eccentric setting and by which a fluidic connection exists between the connecting rod head and the connecting rod pin in every position of the eccentric. Here, the term "substantially" means embodiments in which no structural features are provided which hinder or impede an identical design of the angle ranges. And/or the angle ranges may differ from each other by as much as +/−10°. The circumferential extension describes an angle range about the center point of the eccentric.

In particular, a lubricant supply chamber or the lubricant supply chamber is provided in a plane in which the oil chamber is also provided. Thus, the oil chamber may extend over the entire width of the connecting rod (i.e., in the axial direction of the connecting rod bearing) and thus bring about large forces. Alternatively, a lubricant supply chamber may be provided in a plane in which the oil chamber is not situated. In particular, the lubricant supply chamber may then be configured, for example, as a (partially) encircling groove. In this case, the transfer of the lubricant from the connecting rod to the piston is carried out in laterally offset fashion in the longitudinal direction of the piston pin. In this way, more oil chambers can be provided for the torque transmission.

In another embodiment, the connecting rod head includes at least two oil chambers, each one having a protrusion. The connecting rod head may include exactly two oil chambers, each one having the protrusion. The more oil chambers of this kind are used, the better the torque can be transmitted to the eccentric, although space limits restrict the number of oil chambers and/or their angle range.

Moreover it is advantageous for the connecting rod head to comprise a locking, which is hydraulically or mechanically actuable, and which can be brought into a state of locking which prevents a relative movement of the connecting rod head and the eccentric or a relative movement of the eccentric and the connecting rod pin. The locking may be form fitting. Thanks to the locking it can be ensured that the eccentric always remains in its nominal position, even under pressure fluctuations in the eccentric switching system.

In particular, the oil chamber or oil chambers include an oil inlet and an oil outlet at opposite ends in order to realize a first compression ratio, whose functions can be exchanged in order to realize a second compression ratio. This creates a dual action of the hydraulic system.

Moreover, the eccentric may be adjustable in an angle range of more than 40°, in some cases at least 90° relative to the connecting rod head. This angle range may also be less than 160°. A large angle range is helpful in accomplishing the eccentric action.

A connecting rod with a device for changing a compression ratio (VCR) for an internal combustion engine may include a connecting rod head and a connecting rod pin, which is mounted by an eccentric relative to the connecting rod head. A releasable locking can be provided here in at least one switching position, wherein the locking in a locking position prevents in particular a rotating of the eccentric relative to the connecting rod head. The eccentric can be placed in at least two different positions relative to the connecting rod head. The connecting rod head is preferably formed by an axial end of the connecting rod. The connecting rod head considered here can be located at the end of the connecting rod which is distant from the crankshaft. In this case, the connecting rod pin supports the piston of the engine. Alternatively, the VCR adjustment may be at the end of the connecting rod which is close to the crankshaft. In this case, the connecting rod pin is part of the crankshaft. The combination of the connecting rod with the connecting rod pin can also be called a connecting rod assembly. The at least one switching position is associated each time with one compression ratio. Preferably, there are at least two and in particular precisely two defined switching positions. By protruding means, a detent in the desired switching position is realized. This brings the advantage that the desired ratio is always set and remains set in a permanent and reproducible manner. Furthermore, it has been found that this design can significantly reduce the wear and significantly increase the fatigue strength, because in known designs not using a corresponding locking there is always a certain slippage present, or a relative movement from the eccentric to the adjacent components. This places a strain on the sealing elements and/or corresponding cylinders of the switching process. By preventing these relative movements, there is practically no strain on the sealing and bearing components, among others, used in the condition of no switching of the compression ratio.

It is advantageous for a releasable locking to be provided in each case in at least two switching positions. Especially at the higher compression ratio, large forces are exerted on the mechanism and hydraulic assembly, so that there are special benefits here for a locking. On the other hand, it has also been found that these benefits may be used for both switching positions.

In particular, the locking may comprise a pin, which can engage with a seat, and a hydraulic drive is provided in particular for this. This is one exemplary embodiment. Other embodiments such as hooks engaging by a sliding surface or clamps can be used in an understanding of the equivalence for the locking.

It is moreover preferable for a drain from the hydraulic system of the connecting rod, the drain having a relief throttle, to be provided, by which system hydraulic fluid can be supplied to the engine interior after the activation of a switching actuator for the switching process. In particular in this case, the throttle may also be designed as a duct with a reduced cross section and in particular the reduced cross section of this duct is less than 25% of the duct for the supply of the hydraulic fluid for the compression change. In this way, a pressure relief is created for the locking of the switching device. It is also possible to provide a drain from the hydraulic system of the connecting rod, the drain having a throttle, by which drain hydraulic fluid can be supplied to the engine interior after the activation of a switching actuator for the switching process, and to arrange the throttle in a valve, especially the switching actuator, wherein in particular the throttle can be designed as a leakage of a valve.

In some embodiments, there is no hydraulic fluid supplied via the throttle to the engine interior in the time span after performing a switching of the compression ratio until a new activation of the switching actuator occurs. Thus, hydraulic fluid does not need to be supplied continuously to the connecting rod.

In some embodiments, a device for changing a compression ratio for an internal combustion engine may include a connecting rod head and a connecting rod pin, which is mounted by an eccentric relative to the connecting rod head, wherein two end positions are provided for the adjustability of the eccentric and a dampening is provided for at least one end position in that a component, such as a protrusion of the eccentric, reduces a flow channel for a hydraulic fluid in position-dependent manner, in order to thereby reduce the velocity of the eccentric during the movement into an end position. When switching the compression ratio, the hydraulic fluid flows out of (or into) a corresponding volume and for the greater portion of the movement path of the eccentric its flow resistance remains constant. Near the end positions, the flow resistance increases on account of the reduction of the flow duct, which brakes the speed of movement of the eccentric and thus prevents a hard impact against an end stop.

In a further aspect, a connecting rod may be outfitted with a device for changing a compression ratio (VCR) for an internal combustion engine and comprise two bearing regions, on the one hand for mounting the connecting rod relative to a piston, and on the other hand for mounting on a crankshaft of the internal combustion engine. A switching actuator for activating the adjustment of the compression ratio is in this case arranged between the two bearing regions. In this way, the flow paths and duct lengths inside the connecting rod are shortened, which increases the response speed and lowers the manufacturing costs.

BRIEF DESCRIPTION OF THE DRAWINGS

In the following, the embodiments shall be explained as an example with the aid of the drawings. There are shown:

FIG. 16 schematically depicts a section through the embodiment shown in FIG. 14 in a locked second switching position according to one or more embodiments described and illustrated herein.

DETAILED DESCRIPTION

Figure 1:
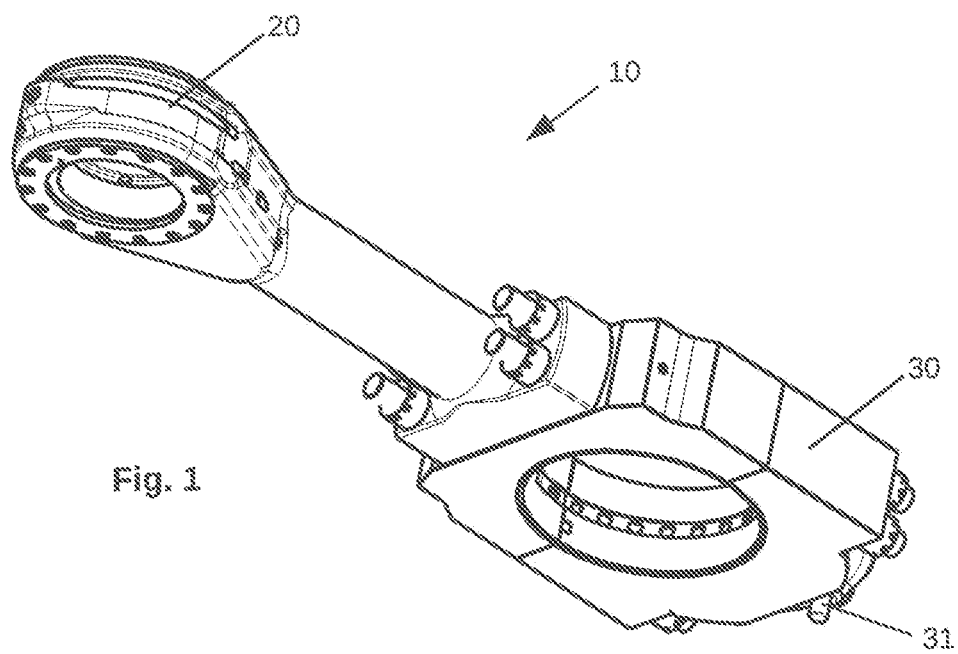
FIG. 1 schematically depicts a perspective view of a connecting rod according to one or more embodiments described and illustrated herein.

FIG. 1 shows in perspective view a connecting rod for a VCR (variable compression ratio) switching system, in which the engine can have different compression ratios. At the right is shown a bearing region of the connecting rod, by which it is mounted on the crankshaft. And a switching actuator 31 can be seen. In the engine housing there are arranged deflector plates, which can be moved in the longitudinal direction of the crankshaft and when these deflector plates are activated the switching actuator 31 is displaced. Via the crankshaft the connecting rod is supplied with lubricating oil, which at first serves for lubricating the bearings of the connecting rod and the piston and for its cooling. A portion of this oil is taken to the switching actuator 31, which comprises a hydraulic valve (not shown) and conducts the lubricating oil into corresponding ducts of the connecting rod depending on the switching state, which has the end effect of switching the compression ratio.

Figure 2:
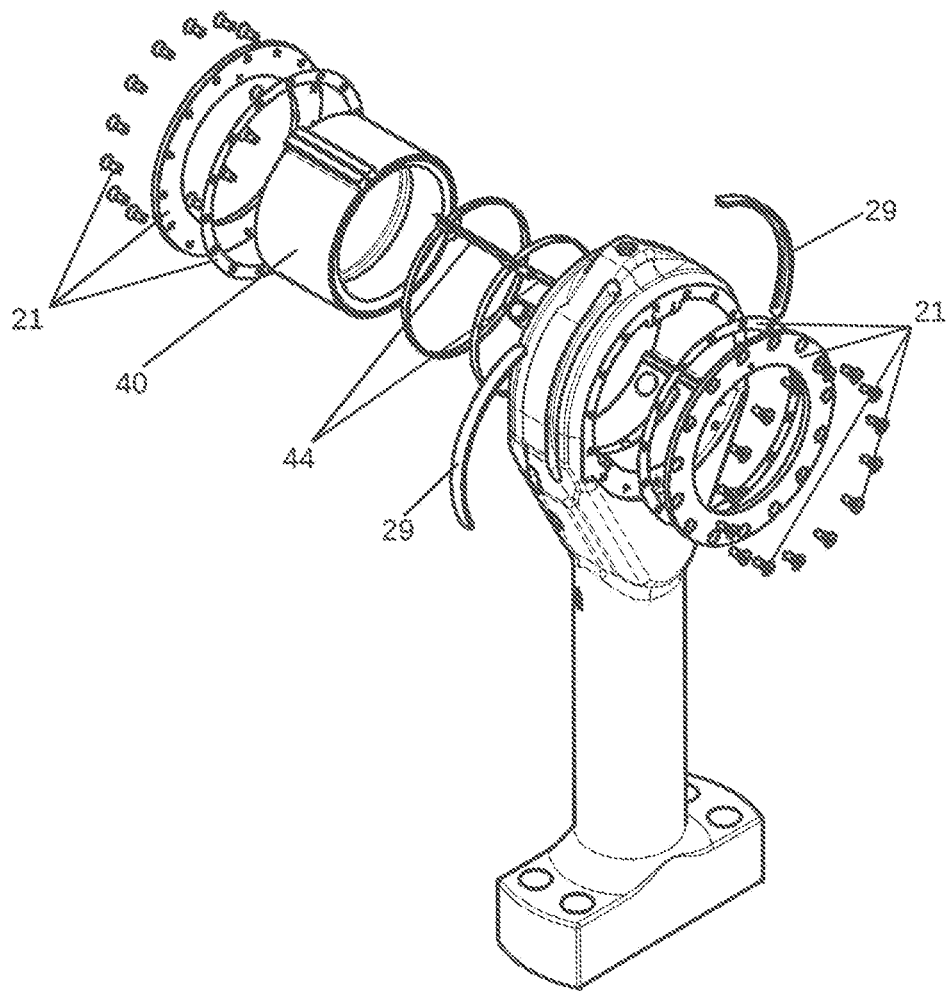
FIG. 2 schematically depicts an exploded view of an upper part of the connecting rod of FIG. 1 according to one or more embodiments described and illustrated herein.
Figure 3:
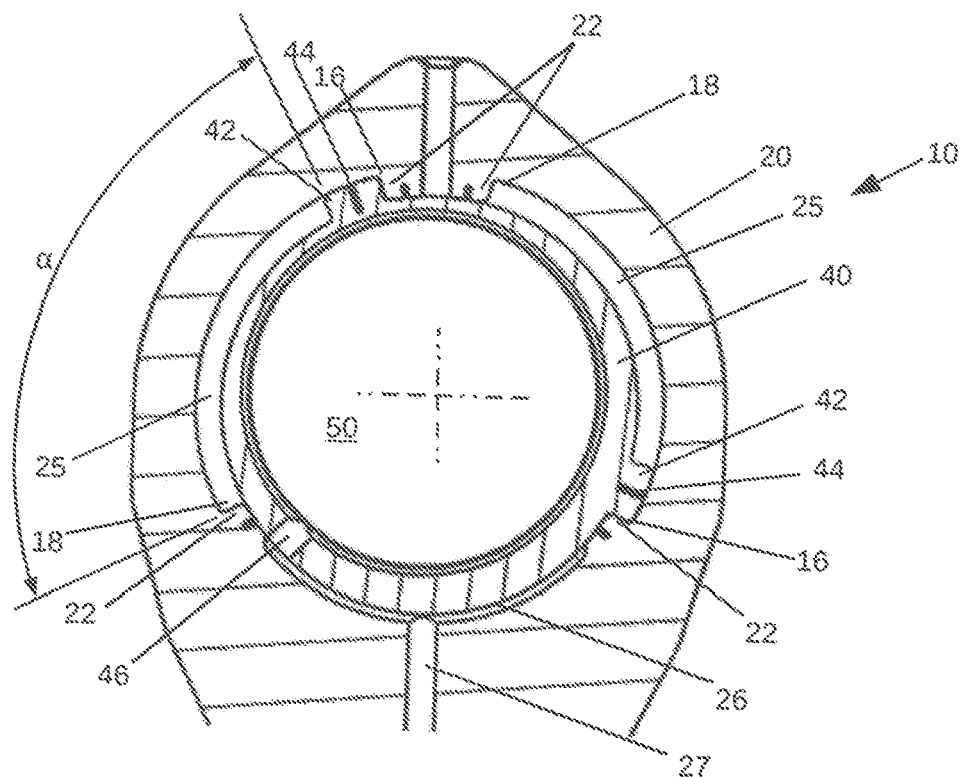
FIG. 3 schematically depicts a central section through the head of the connecting rod according to one or more embodiments described and illustrated herein.

In FIGS. 2 and 3 an eccentric (ring) 40 can be seen, which is rotatably mounted in the connecting rod head 20 and which in turn supports a connecting rod pin 50 (see FIG. 7), which in turn supports a piston 70. When the eccentric 40 is turned in the plane of the drawing of FIG. 3, the position of the connecting rod pin 50 is displaced in the longitudinal direction of the connecting rod 20.

As a guide element for the eccentric 40, it is provided with a protrusion 42 respectively at two radially outside points, which reach into oil chambers 25. The oil chambers 25 are arranged in the form of a ring-shaped arc section in the connecting rod head 20 and are provided at their ends respectively with an oil inlet 16 and an oil outlet 18, which act in opposition for the oppositely directed eccentric movement. The cross section of the oil chambers 25 is sealed fluid-tight by the protrusion 42, making use of sealing elements 44. When the switching actuator 31 is placed in the position shown in FIG. 9, oil flows into the inlet 16 and at the same time an outflow through the outlet 18 is made possible. A rotary movement of the eccentric 40 can now occur, which is basically accomplished by forces arising in the combustion and acting on the eccentric via the piston. Oil flowing in at the oil inlet 16 supports this movement. A check valve 76 ensures that the eccentric 40 in this switching state cannot move in the respectively oppositely directed movement. Furthermore, this movement is also supported by the inertial forces (mass forces) of the connecting rod and the eccentric. A switching of the switching actuator 31 brings about a reversal of the oil flows and a reversal of the eccentric 40 in the other direction. At the end points of this rotational range thus produced with the angle range a there is provided a respective end stop 22. The oil flow, as already explained, is initiated by the switching actuator 31. The device required for this is arranged in the lower part of the connecting rod 10, i.e., at the crankshaft side. In FIG. 10, for example, a corresponding hydraulic guide is shown within the connecting rod head 20. Bores are employed for this, being closed at the connecting rod outside, and this is supplemented by a duct closed by a covering 29. By these means, the oil is conveyed to the transfer points into the oil chambers 25, which may respectively act as oil inlets 16 or oil outlets 18. A corresponding hydraulic guide is provided for the transfer point 18. This is offset transversely to the connecting rod longitudinal direction as compared to the hydraulic guide shown in FIG. 10. In some embodiments, at least one oil chamber 25 is required, while preferably more than 2, namely 3 or more oil chambers, can also be used.

Figure 7:
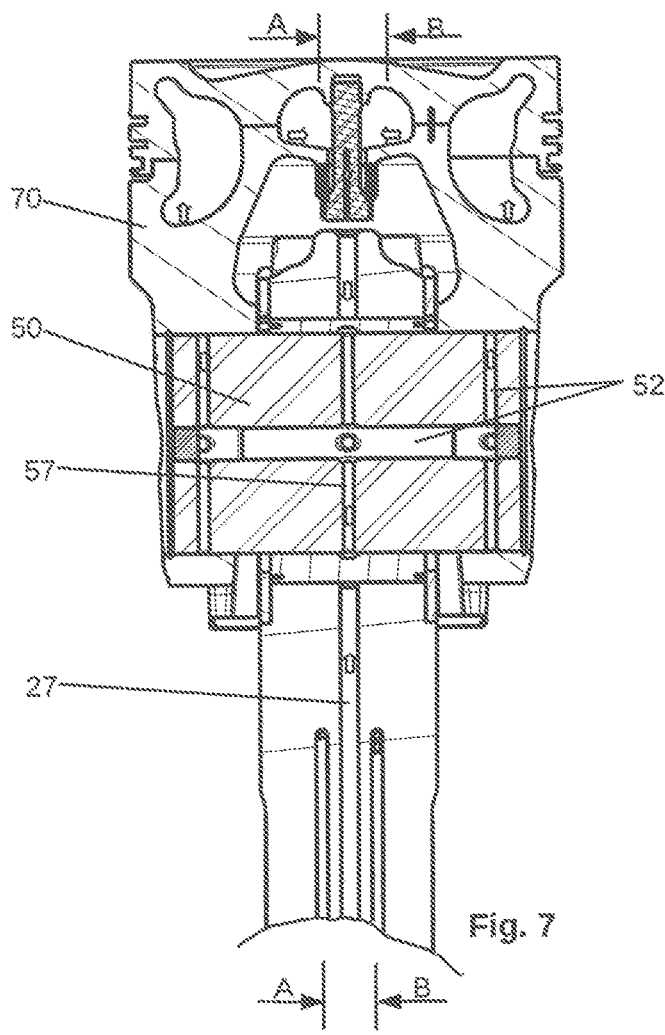
FIG. 7 schematically depicts a longitudinal section through the connecting rod with the connecting rod pin 50 according to one or more embodiments described and illustrated herein.

FIGS. 3 and 7 show an oil supply duct 27, which serves for the supplying of oil for lubricating and cooling purposes and is oriented in the longitudinal direction in the connecting rod 10, emerging into a lubricant supply chamber 26. The lubricant supply chamber 26 is associated with a breach 46 of the eccentric 40. And the lubricant supply chamber 26 has a circumferential extension, corresponding to the angle range a for the adjustability of the eccentric and is arranged such that oil can flow into the eccentric 40, namely, a supply duct 57 situated there (see FIG. 7), at each angle setting of the eccentric 40. The oil is taken via further pin ducts 52 to the piston 70, where the oil performs its lubricating and cooling functions. The flow direction is indicated by small arrows in FIG. 7.

Figure 4:
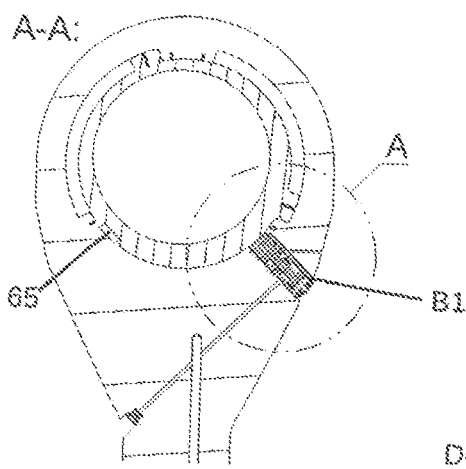
FIG. 4 schematically depicts a section through the head of the connecting rod in plane A-A of FIG. 7 according to one or more embodiments described and illustrated herein.
Figure 5:
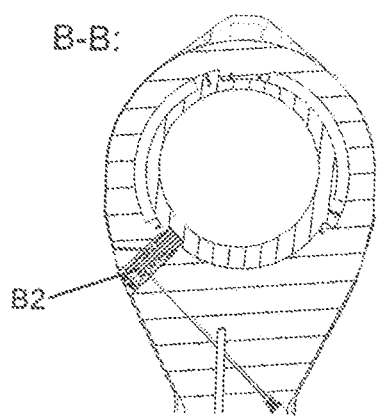
FIG. 5 schematically depicts a section through the head of the connecting rod in plane B-B of FIG. 7 according to one or more embodiments described and illustrated herein.
Figure 6:
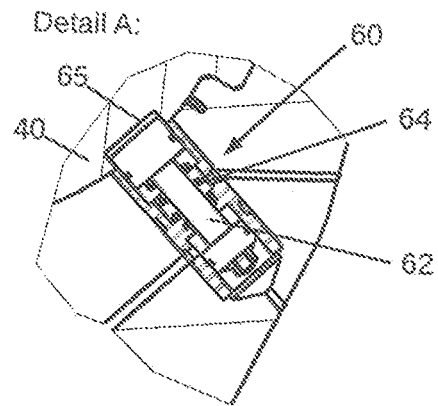
FIG. 6 schematically depicts a detail A of FIG. 4 according to one or more embodiments described and illustrated herein.

FIGS. 4 and 5 show in sectional view together with the detail of FIG. 6 a locking device 60, which can be initiated each time by one of the oil flows for switching of the compression ratio. The cross sections shown A-A and B-B run transversely and off-center through the connecting rod 10, as is seen from FIG. 7. According to FIG. 6, the locking device 60 comprises a detent piston 62, which is mounted in the connecting rod head 20 and has an end which can be received in a seat 65 of the eccentric 40. A spring 64 presses the detent piston 62 in this direction and a hydraulic chamber of the detent piston 62 is arranged such that corresponding oil pressure can overcome the spring force of the spring 64 and can thus pull the detent piston 62 out from its seat 65. This design can ensure that even under certain pressure fluctuations within the oil supply system for the oil inlets and oil outlets 16 and 18 the eccentric 40 constantly remains in its nominal position, as long as no demand for switching is present. Also during every crankshaft revolution there exists a relative movement between the piston 70 and the connecting rod 10 and the bearing position of this relative movement is defined by the locking device 60, which comprises a detent piston 62 and a spring 64. It is ensured that, in the locking state, no relative movement of the eccentric 40 and the connecting rod head 20 can occur. The two locking systems are situated at the end points of the adjustable range of the eccentric 40. At the location at which the breach 46 is shown in FIG. 3, the seat for the detent piston 62 is arranged in the thickness direction of the connecting rod 10 (i.e., perpendicular to the plane of the drawing of FIG. 3). Accordingly, FIG. 3 shows the position of the eccentric 40 in which the detent piston of FIG. 5 can be received in its seat. A further seat is arranged in a position which is in the longitudinal direction of the connecting rod pin to the aforementioned seat, in which the detent piston 62 of FIG. 4 can be received. The detent pistons thus lie in the planes A-A and B-B of FIG. 7.

Figure 8:
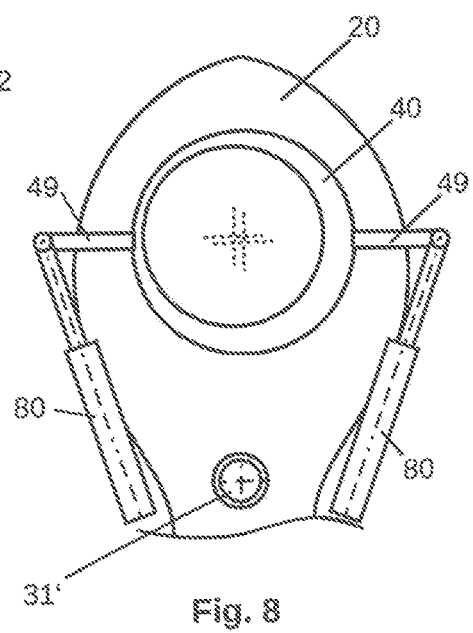
FIG. 8 schematically depicts an alternative embodiment of the adjusting device for the eccentric 40 according to one or more embodiments described and illustrated herein.

FIG. 8 shows as an example two alternative embodiments which may be used independently of each other. Firstly, two hydraulic cylinders 80 are shown with corresponding pistons, which are configured as a linear drive. In this embodiment, the above described oil chambers 25 with the corresponding protrusions 42 are not used. Instead, the hydraulic cylinders are coupled by a corresponding mechanism, such as a web 49, to the eccentric 40. If, optionally, one or the other of the hydraulic cylinders 80 is extended by application of pressure, the eccentric 40 will rotate accordingly relative to the connecting rod head 20. Furthermore, a switching actuator 31' of an alternative embodiment is shown. As described above and depicted in FIG. 1, a switching actuator 31 can be on the "bottom" i.e., at that end of the connecting rod which is distant from the piston 70. The already described deflector plates can be moved in the crankshaft longitudinal direction and activate the switching actuator, which projects beyond the connecting rod at one end, depending on the switching state. The switching actuator 31' is arranged adjacent to the eccentric 40. Thus, no duct system is needed extending across the connecting rod along its longitudinal direction, but instead it can be connected by shorter connecting ducts to the hydraulic cylinders 80 or the oil chambers 25 and/or the locking system 60.

Figure 9:
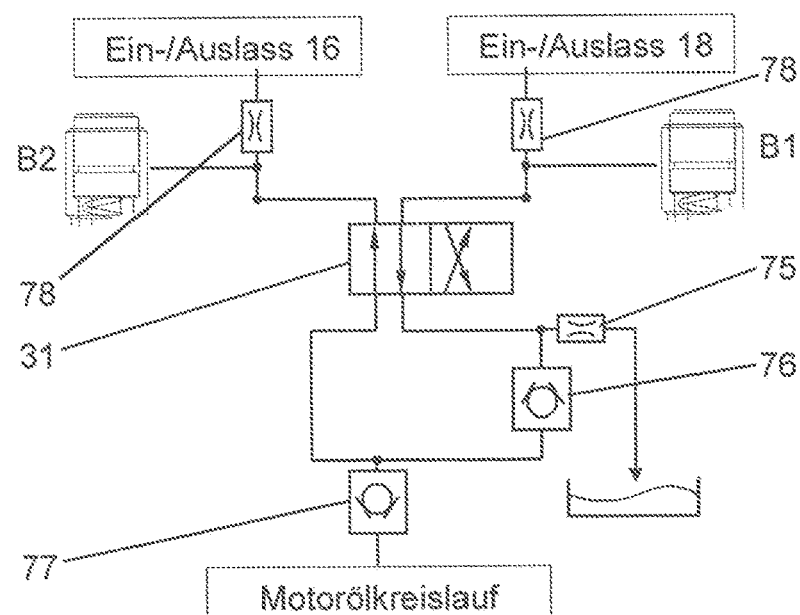
FIG. 9 schematically depicts a circuit diagram of the hydraulic system within the connecting rod according to one or more embodiments described and illustrated herein.
Figure 10:
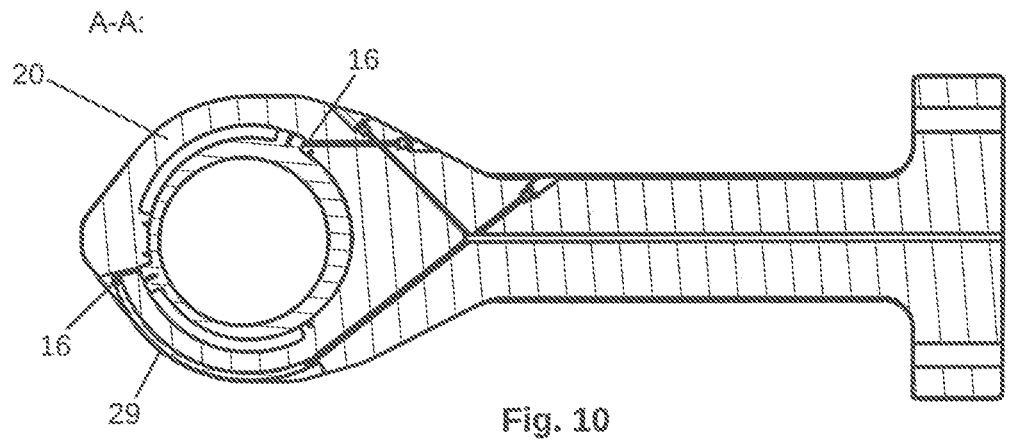
FIG. 10 schematically depicts section A-A of FIG. 7 according to one or more embodiments described and illustrated herein.

FIG. 9 shows an exemplary circuit diagram of the hydraulic system. First of all, it is shown how the connecting rod 10 is supplied with oil from the engine oil circuit. This occurs via the crankshaft and a filling check valve 77, which only allows for the filling of the hydraulic system, but not a return flow into the engine oil circuit. In the flow direction upstream from the filling check valve 77 there may be provided a branching (not shown), where oil is diverted for the lubricating of the connecting rod bearing. When the switching actuator 31 is switched into its position as shown here, oil flows on account of the forces acting on the piston from the oil outlet 18 to the oil inlet 16. A back flow under a change in the force conditions is prevented by the check valve 76. At the same time, the locking system B2 is supplied with pressure, whereby the detent piston 62 is pulled out from the seat of the eccentric 40 against the spring force of the spring 64, so that the eccentric 40 is able to rotate. In other words, the unlocking must first occur by means of engine oil pressure. Only then is the eccentric able to rotate. Only by the rotation of the eccentric are the pressures created which allow the oil to flow from 18 to 16.

The rotation of the eccentric 40 is brought about by the inflowing oil, connected with the forces of rotary/swiveling movement of the piston 70. In order to further assist and direct this movement, a further check valve 76 is provided in this oil flow. This prevents a backflow into the respective oil chamber 25 to be emptied or the piston 80. Thanks to the switching of the switching actuator 31 to the indicated position, the eccentric 40 ends up in the other end position, not shown in FIG. 3. This has the result that the region in the flow direction downstream from the check valve 76 becomes pressurized. The region in the flow direction upstream from the check valve 76 is connected to the engine interior via a relief throttle 75. In this way, a portion of the hydraulic fluid can be diverted from the hydraulic system. Thus, on the one hand, the pressure declines in this region and oil can thereby flow out from the hydraulic locking system 60. As a result, the equilibrium of forces in the locking system 60 is shifted, so that forces are built up by the spring 64, which press the detent piston 62 against the eccentric 40. And as soon as the rotation of the eccentric aligns its corresponding seat 65 with the detent piston 62, it is displaced into the seat 65, which results in the locking in the switching position and the switching process is terminated with this. For the switching to the other compression ratio, corresponding to the eccentric setting of FIG. 3, the processes run accordingly, as can be directly seen from the circuit diagram.

In the fluid direction upstream from the oil inlet 16, 18 there is arranged a respective throttle, which is termed in particular filling throttle 78 and which is situated behind a branch leading to the respective locking system B1, B2. These filling throttles 78 have the purpose that, at the beginning of a switching process when the pressure in the respective system is rising, a sufficient fluid flow gets directly into the respective locking system B1 or B2, so that this locking system B1, B2 is already released as fast as possible and thus the adjustment process is quickly initiated, since only after the releasing of the respective locking system can fluid get from the region to be emptied (i.e., oil chamber 25 or cylinder 80) to the other respective region.

All of the aforementioned throttles 75, 78 may be designed respectively as a (local) reduction of a flow cross section. Alternatively, the corresponding duct may also have a reduced cross section for a (certain) flow length, so that in this way the desired flow rate reduction is accomplished. While the disclosure has been explained above in regard to an arrangement at the head of the connecting rod, it may be used accordingly at the foot of the connecting rod, i.e., at the place where the crankshaft is mounted, and this solution is regarded as being equivalent.

Furthermore, preferably and optionally throttles can be used which are integrated in the hydraulic system and which limit or reduce the flow rate. These throttles may be arranged directly at the combined inlet/outlet 16, 18 of the hydraulic drive elements, as is shown by the reference number 78 in FIG. 9. This prevents the system from moving at high speed and without braking from one end stop against the other end stop. This throttling function or the function of reduction of the flow rate can also be accomplished by suitably dimensioned flow cross sections. A flow cross section reduced for a portion is also possible. Alternatively, a throttle with this function can be arranged at another place, such as adjacent to the check valve 76.

Figure 11:
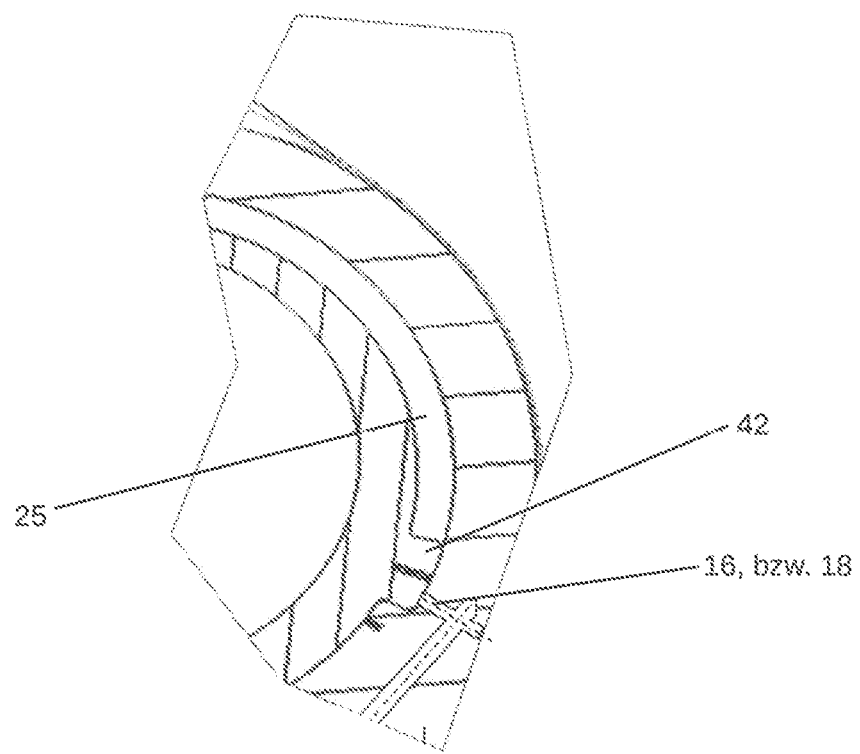
FIG. 11 schematically depicts an enlarged feature of the connecting rod in the area of the hydraulic lines according to one or more embodiments described and illustrated herein.

The hydraulic lines as shown in FIG. 11 may be connected to the respective chamber 25 in such a way that they are partly or entirely closed by the protrusions 42 shortly before reaching the end positions. The oil passage between the pressurized spaces is increasingly throttled as the end positions are neared. In order to accomplish this, the oil inlet and oil outlet 16, 18 lead radially or at least with a radial directional component into the oil chamber 25 and the opening of the oil inlet and oil outlet 16, 18 in an end position of the eccentric lies at least partly or entirely overlapping with the corresponding protrusion 42 of the eccentric 40. When the eccentric 40 nears its end position, the oil volume between the protrusion 42 and the end of the oil chamber 25 must thus flow out into the outlet 18, which occurs increasingly with a higher flow resistance on account of the reduced flow cross section, which in turn limits the speed of movement of the eccentric 40.

Figure 12:
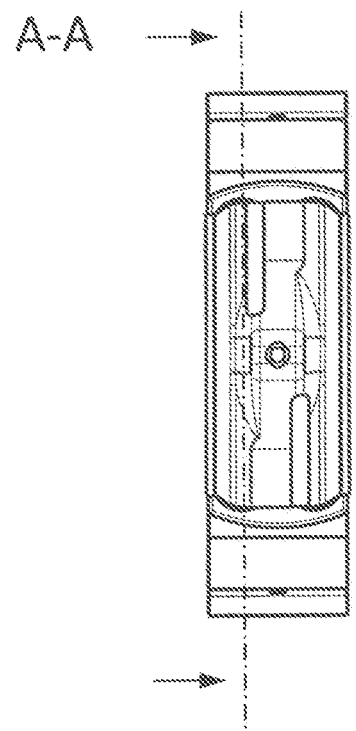
FIG. 12 schematically depicts an embodiment of a connecting rod with a further alternative releasable locking according to one or more embodiments described and illustrated herein.
Figure 13:
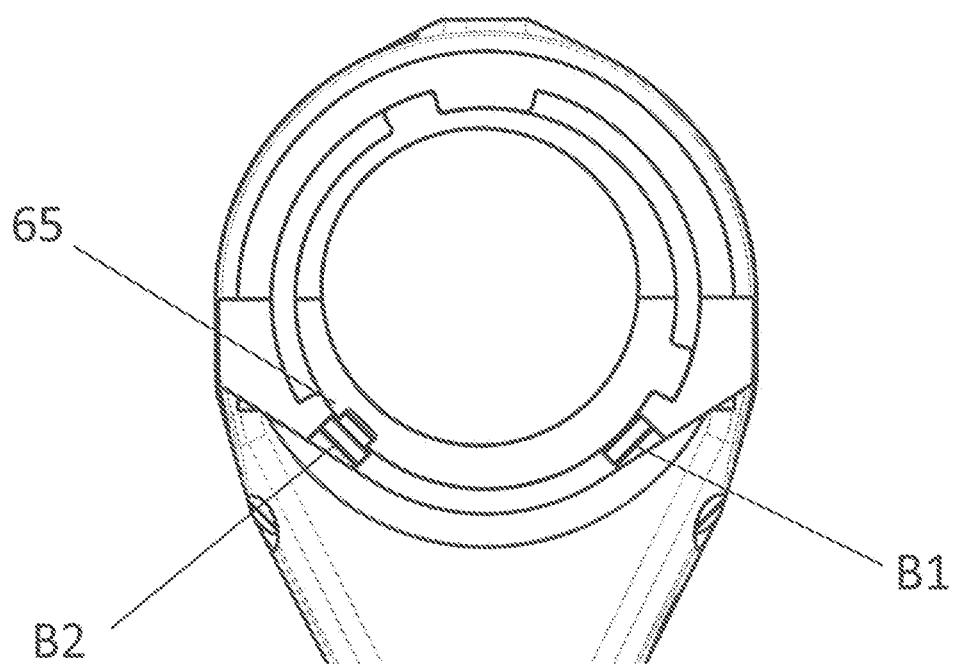
FIG. 13 schematically depicts a section through the embodiment shown in FIG. 12 according to one or more embodiments described and illustrated herein.

FIGS. 12 and 13 show a further embodiment of a connecting rod, here with an alternative embodiment of a releasable locking system. FIG. 12 shows a front view, FIG. 13 shows a section along the sectioning line A-A shown in FIG. 11.

The connecting rod in keeping with the previously represented embodiments comprises a first locking system B1 for the first switching position and a second locking system B2 for the second switching position. Furthermore, the connecting rod comprises a seat 65. In this embodiment, the seat 65 is provided for both the locking system B1 and the locking system B2. That is, in an implementing of the locking systems with a pin 62, the pin 62 of the respective locking system B1, B2 engages in the same seat 65. In the exemplary embodiment shown here, this is achieved in that the locking systems B1 and B2 are arranged in the same plane. FIG. 13 shows the engagement in the second switching position, in which the locking system B2 locks the position. Accordingly, in the first switching position with the position of the pin 62 locked, the locking system B1 engages with the seat 65 (not shown). The benefit of this embodiment is that only one seat needs to be provided. This enables more economical manufacturing and/or benefits in terms of strength.

Figure 14:
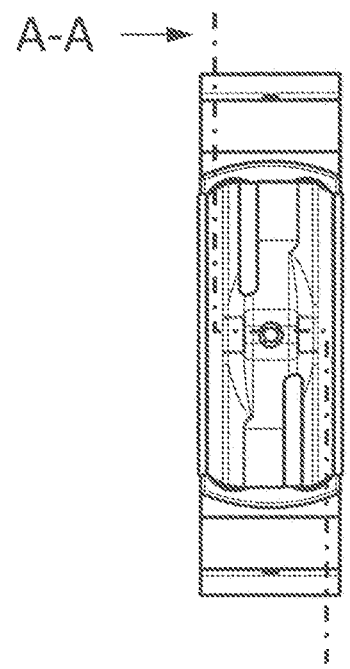
FIG. 14 schematically depicts an embodiment of a connecting rod with a further alternative releasable locking according to one or more embodiments described and illustrated herein.
Figure 15:
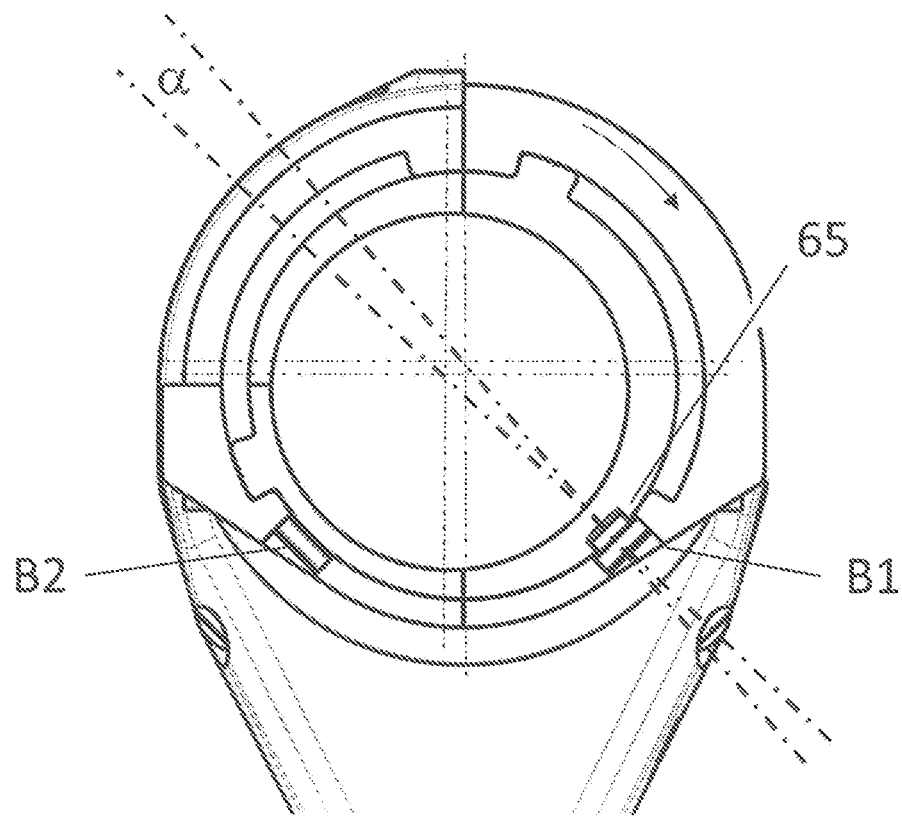
FIG. 15 schematically depicts a section through the embodiment shown in FIG. 14 in a locked first switching position according to one or more embodiments described and illustrated herein.

FIGS. 14 to 16 show a further embodiment of a connecting rod, here with a further alternative embodiment of a releasable locking system. FIG. 14 shows a front view, FIGS. 15 and 16 show a section along the sectioning line A-A shown in FIG. 14.

The connecting rod in keeping with the previously represented embodiments comprises a first locking system B1 for the first switching position (FIG. 15) and a second locking system B2 for the second switching position (FIG. 16). Furthermore, the connecting rod comprises two seats 65. One seat is associated respectively with one of the two locking systems.

In this embodiment, the pin 62 of the locking systems B1, B2 is situated rotated by an angle α with respect to the eccentric axis. This makes it possible to ensure a faster and more reliable unlocking by oil pressure. A rotation in the range of 5°-15° has been found to be especially advantageous. In this exemplary embodiment, the rotation is α=10°.

A further variant (not shown) calls for providing a seat 65 for both locking systems B1 and B2 and for the pins of the locking system to be rotated with respect to the eccentric axis.

Although the disclosure has been explained above in regard to an arrangement at the head of the connecting rod, it can also be used accordingly at the foot of the connecting rod, i.e., at the place mounted on the crankshaft, and this solution is regarded as being equivalent.

The invention claimed is:

1. An internal combustion engine having a connecting rod with a device for changing a compression ratio (VCR) of the internal combustion engine, the internal combustion engine comprising:
a connecting rod head and a connecting rod pin which is mounted by an eccentric relative to the connecting rod head,
wherein:
either the connecting rod head or the connecting rod pin has at least one oil chamber and the eccentric having a protrusion reaching into the oil chamber, or
the eccentric including or delimiting at least one oil chamber and the connecting rod head or the eccentric having a protrusion reaching into the oil chamber, such that an oil pressure in the oil chamber exerts a force on the protrusion to change the eccentric setting of the eccentric and
a lubricant supply chamber is positioned between the connecting rod head and the eccentric, the lubricant supply chamber having an arcuate shape.

2. The internal combustion engine according to claim 1, wherein the oil chamber has a defined movement range (α) for the protrusion, at the ends of which is situated respectively an oil inlet and an oil outlet and the angle range (α) is preferably limited by end stops.

3. The internal combustion engine according to claim 1, wherein:
the eccentric is adjustable with respect to the connecting rod head in an angle range (α) and
the eccentric having a breach associated with the lubricant supply chamber such that regardless of a set angle of the angle range (α) a fluidic connection always exists between a supply duct of the connecting rod and a supply duct of the connecting rod pin.

4. The internal combustion engine according to claim 1, wherein a lubricant supply chamber is provided in a plane in which the oil chamber is also provided.

5. The internal combustion engine according to claim 1, wherein the lubricant supply chamber is provided in a plane in which the oil chamber is not situated.

6. The internal combustion engine according to claim 1, wherein the connecting rod includes at least two oil chambers, each one having a protrusion.

7. The internal combustion engine according to claim 1, wherein the connecting rod head further comprises:
a locking, which is hydraulically actuable, and which can be brought into a state of locking which prevents a relative movement of the connecting rod head and the eccentric which prevents a relative movement of the eccentric and the connecting rod pin.

8. The internal combustion engine according to claim 1, wherein the oil chamber or oil chambers further comprises:
an oil inlet and an oil outlet at opposite ends in order to realize a first compression ratio, whose functions can be exchanged in order to realize a second compression ratio.

9. The internal combustion engine according to claim 1, wherein the eccentric can be adjusted in an angle range (α) of more than 40° and in an angle range (α) less than 160°.

10. The internal combustion engine according to claim 1, wherein the eccentric is adjustable in an angle range (α) of less than 120°.

11. The internal combustion engine according to claim 1, wherein:
a releasable locking is provided in at least one switching position,
wherein the locking in the locking position prevents in particular a rotating of the eccentric relative to the connecting rod head.

12. The internal combustion engine according to claim 11, wherein a releasable locking is provided in each case in at least two switching positions.

13. The internal combustion engine according to claim 11, wherein the locking comprises a pin, which can engage with a seat, and a hydraulic drive is provided in particular for this.

14. The internal combustion engine according to claim 11, wherein the connecting rod has at least one hydraulic drive, the at least one hydraulic drive has a hydraulic piston and a hydraulic cylinder for adjusting the eccentric setting.

15. The internal combustion engine according to claim 11, wherein:
- a drain from the hydraulic system of the connecting rod, the drain having a relief throttle, is provided, by which system hydraulic fluid can be supplied to the engine interior after the activation of a switching actuator for the switching process,
- wherein the relief throttle has a reduced cross section with respect to the duct for the supply of the hydraulic fluid for the compression change.

16. The internal combustion engine according to claim 11, wherein:
- a drain from the hydraulic system of the connecting rod, the drain having a relief throttle, is provided, by which system hydraulic fluid can be supplied to the engine interior after the activation of a switching actuator for the switching process, and the relief throttle is arranged in a valve in the switching actuator,
- and the relief throttle is designed as a leakage of a valve and/or a hydraulic element, such as the oil chamber.

17. The internal combustion engine according to claim 15, wherein no hydraulic fluid is supplied via the relief throttle to the engine interior in the time span after performing a switching of the compression ratio until a new activation of the switching actuator occurs.

18. An internal combustion engine having a connecting rod with a device for changing a compression ratio (VCR) of the internal combustion engine, the internal combustion engine comprising:
- a connecting rod head and a connecting rod pin, which is mounted by an eccentric relative to the connecting rod head, wherein two end positions are provided for the adjustability of the eccentric and a dampening is provided for at least one end position, the connecting rod head or eccentric having a protrusion,
- a lubricant supply chamber positioned between the connecting rod head and the eccentric, the lubricant supply chamber having an arcuate shape,
- wherein the protrusion of the eccentric or the connecting rod head reduces a flow channel for a hydraulic fluid in position-dependent manner, thereby reduces a velocity of the eccentric during the movement into an end position.

19. An internal combustion engine having a connecting rod with a device for changing a compression ratio (VCR) of the internal combustion engine, the internal combustion engine comprising:
- a bearing region for mounting the connecting rod relative to a piston and a bearing region for mounting the connecting rod on a crankshaft of the internal combustion engine, and
- a switching actuator positioned between the two bearing regions, the switching actuator is actuatable between a first position and a second position,
- wherein the movement of the actuator between the first position and the second position controls a fluid for activating the adjustment of the compression ratio.

20. The internal combustion engine according to claim 19, further comprising:
- a releasable locking is provided in each case in at least two switching positions;
- a first pin;
- a second pin; and
- a seat,
- wherein the connecting rod is configured such that in the first switching position the first pin can engage with the seat and in the second switching position the second pin can engage with the seat.

\* \* \* \* \*